United States Patent
Pepper (10) Patent No.: US 8,050,175 B2
(45) Date of Patent: Nov. 1, 2011

(54) DISTRIBUTED PACKET GROUP IDENTIFICATION FOR NETWORK TESTING

(75) Inventor: Gerald R. Pepper, Thousand Oaks, CA (US)

(73) Assignee: IXIA, Calabasas, CA (US)

(*) Notice: Subject to any disclaimer, the term of this patent is extended or adjusted under 35 U.S.C. 154(b) by 0 days.

(21) Appl. No.: 12/627,925

(22) Filed: Nov. 30, 2009

(65) Prior Publication Data

US 2010/0074135 A1    Mar. 25, 2010

Related U.S. Application Data

(63) Continuation of application No. 11/558,855, filed on Nov. 10, 2006, now Pat. No. 7,643,431.

(51) Int. Cl.
  *G01R 31/08* (2006.01)
(52) U.S. Cl. .................. 370/224; 370/519; 709/224
(58) Field of Classification Search .............. 307/252, 307/241, 253, 517, 519; 709/224
  See application file for complete search history.

(56) References Cited

U.S. PATENT DOCUMENTS

| | | | |
|---|---|---|---|
| 5,343,463 A | 8/1994 | Van Tetering et al. | |
| 5,477,531 A | 12/1995 | McKee | |
| 5,600,632 A | 2/1997 | Schulman | |
| 5,878,032 A | 3/1999 | Mirek et al. | |
| 6,028,847 A | 2/2000 | Beanland | |
| 6,172,989 B1 | 1/2001 | Yanagihara | |
| 6,233,256 B1 | 5/2001 | Dieterich et al. | |
| 6,252,891 B1 | 6/2001 | Perches | |
| 6,295,557 B1 | 9/2001 | Foss | |
| 6,360,332 B1 | 3/2002 | Weinberg | |
| 6,446,121 B1 | 9/2002 | Shah et al. | |
| 6,545,979 B1 | 4/2003 | Poulin | |
| 6,601,098 B1 | 7/2003 | Case et al. | |
| 6,717,917 B1 | 4/2004 | Weissberger et al. | |
| 6,728,929 B1 | 4/2004 | Luong | |
| 6,789,100 B2 | 9/2004 | Nemirovsky | |
| 6,910,061 B2 | 6/2005 | Hu et al. | |
| 6,950,405 B2 | 9/2005 | Van Gerrevink | |
| 7,088,735 B1 | 8/2006 | Reohr et al. | |
| 7,295,555 B2 | 11/2007 | Elzur | |
| 7,451,458 B2* | 11/2008 | Tuchow ................ | 719/328 |
| 2004/0052259 A1 | 3/2004 | Garcia et al. | |
| 2004/0131013 A1* | 7/2004 | Ise et al. ................ | 370/229 |
| 2004/0158744 A1* | 8/2004 | Deng et al. ............ | 713/201 |
| 2005/0286564 A1 | 12/2005 | Hatley | |
| 2006/0088060 A1 | 4/2006 | Fujikami et al. | |
| 2007/0115833 A1 | 5/2007 | Pepper | |

* cited by examiner

*Primary Examiner* — Jung Park
(74) *Attorney, Agent, or Firm* — SoCal IP Law Group LLP; Steven C. Sereboff; John E. Gunther (57) ABSTRACT

There is disclosed a method, an apparatus, a computing device, and a storage medium for testing a network. A plurality of packets may be received. A packet group identification number for each packet may be determined by extracting two or more packet group identification fields from the packet, each packet group identification field located at a respective offset from one of a signature field, a start of the packet, a start of an IP header, and a start of a protocol header; and combining the two or more packet group identification fields to form the packet group identification number. The network testing system may measure, compile, and store performance statistics for packets having the same packet group identification number.

13 Claims, 7 Drawing Sheets

DISTRIBUTED PACKET GROUP IDENTIFICATION FOR NETWORK TESTING

This patent claims priority from prior-filed non-provisional patent Application No. 11/558,855, filed Nov. 10, 2006, and entitled DISTRIBUTED PACKET GROUP IDENTIFICATION FOR NETWORK TESTING, now U.S. Pat. No. 7,643,431.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field of the Invention

This disclosure relates to network communications, packets, data units, and the transmission of and receipt of network traffic.

2. Description of the Related Art

Networks such as the Internet carry a variety of data communicated using a variety of network devices including servers, routers, hubs, switches, and other devices. Before placing a network into use, the network and the network devices, network media, network segments and network applications included therein, may be tested to ensure successful operation. Network media, segments, devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network segments, network applications and network devices, networks may be augmented with network analyzing devices, network conformance systems, network monitoring devices, and network traffic generators, all of which are referred to herein as network testing systems. The network testing systems may allow for analyzing the performance of networks, network applications and network devices by capturing, modifying, analyzing and/or sending network communications.

Network testing systems may send and receive a large amount of network traffic and may establish and end many communication sessions. Network interface devices, units, cards, chips and the like within a network testing system may perform much of the work in sending and receiving network traffic and establishing and ending sessions. To track network communications sent and received by network testing systems so that network devices may be tested, network communications are prepared with test information. The functioning of a device under test may be evaluated based on review of the test information included in network communications.

DETAILED DESCRIPTION

Throughout this description, the embodiments and examples shown should be considered as exemplars, rather than limitations on the apparatus and methods disclosed or claimed.

Description of Apparatus

Figure 1:
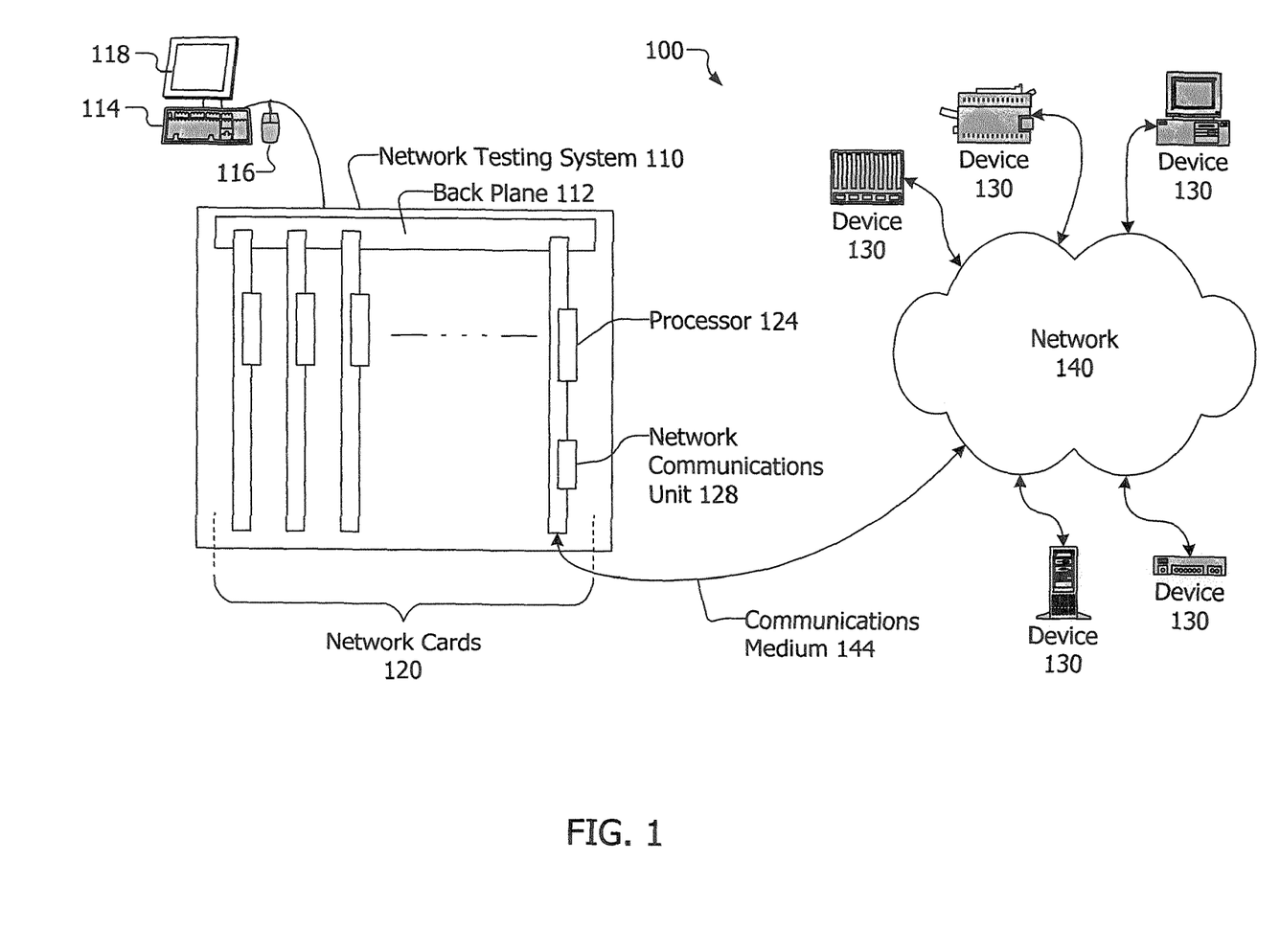
FIG. 1 is a diagram of an environment in which distributed packet group identification may be implemented.

Referring now to FIG. 1, there is shown a block diagram of a network testing environment 100. The environment includes network testing system 110 coupled via a network card 120 to a network 140 over a communications medium 144. The network testing system 110 may include or be one or more of a performance analyzer, a conformance validation system, a network analyzer, a data unit blaster, a network management system, a combination of these, and/or others. The network testing system may be used to evaluate and/or measure characteristics and performance of a communication line or system, including the throughput of network traffic, the number of dropped data units, jitter, and many others. The network testing system may be used to evaluate the performance of servers, networking devices such as, for example, routers, gateways, load sharers, and others, as well as network application programs and other software.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a backplane 112. The network cards 120 may be coupled with the backplane 112. One or more network cards 120 may be included in the network testing system 110. The network cards 120 may be permanently installed in the network testing system 110, may be removable, or may be a combination thereof.

The network testing system 110 and/or one or more of the network cards 120 may include an operating system such as, for example, versions of MS DOS, Microsoft Windows, Mac OS, Palm OS, Symbian OS, Unix or Linux.

Network card 120 is coupled with network 140 via a communications medium 144. Although only one connection over communications medium 144 is shown, each of the network cards 120 may be connected with network 140 over a communications medium. The communications medium may be, for example, wire lines such as an Ethernet cable, fiber optic cable, or coaxial cable, and may be wireless.

The network testing system 110 and the network cards 120 may support one or more well known higher level communications standards or protocols including the Hypertext Transfer Protocol (HTTP); may support one or more well known lower level communications standards or protocols such as, for example, the 10 and/or 100 Gigabit Ethernet standards, the Fiber Channel standards, one or more varieties of the IEEE 802 Ethernet standards, Sonet, CDMA, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®) and Bluetooth; may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, data unit engine cards, service cards, smart cards, switch cards, relay access cards, CPU cards, port cards, and others. The network cards 120 may be referred to as blades, particularly when a processor is included on the network card. The network cards 120 may include one or more processors 124 and one or more network communications units 128.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols in hardware. The network communications unit 128 may include a network interface through which the network card 120 may transmit and/or receive communications over the network 140.

The backplane 112 may serve as a bus or communications medium for the network cards 120. The backplane 112 may also provide power to the network cards 120.

The network testing system 110 may have a computer coupled thereto (not shown). The computer may be local to or remote from the network testing system 110. In another embodiment, the network testing system 110 may include a CPU on a card, motherboard or backplane that allows the chassis to also serve as a computer workstation. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or the backplane 112.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the devices 130 in the network 140. The network testing system 110 may be used to test and evaluate the network 140 and/or portions thereof, network capable devices 130, application programs running on network capable devices 130, and/or services provided by network 140 and/or network capable devices 130.

The network 140 may be a local area network (LAN), a wide area network (WAN), a storage area network (SAN), or a combination of these. The network 140 may be wired, wireless, or a combination of these. The network 140 may include or may be the Internet. The network 140 may be public or private, may be a segregated test network, may be data unit switched or circuit switched, and may be a combination of these. The network 140 may be comprised of a single or numerous nodes providing numerous physical and logical paths for data units to travel.

Communications on the network 140 may take various forms, including packets, frames, cells, datagrams, data units, higher level logical groupings of data, or other units of information, all of which are referred to herein as packets. Those packets that are communicated over a network are referred to herein as network traffic. The network traffic may include packets that represent electronic mail messages, computer files, web pages, graphics, documents, audio and video files, streaming media such as music, video, telephone (voice) conversations, and others.

The network capable devices 130 may be devices capable of communicating over the network 140 and/or listening to, injecting, delaying, dropping, and/or modifying network traffic on network 140. The network capable devices 130 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and storage area network (SAN) devices; testing equipment such as analyzing devices, network conformance systems, emulation systems, network monitoring devices, and network traffic generators; and networking devices such as routers, relays, firewalls, hubs, switches, bridges, traffic accelerators, and multiplexers. In addition, the network capable devices 130 may include appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

To communicate data units on the network 140, the network testing system 110 may have various types of application programs, such as test applications. Test applications have functions such as performance analysis, conformance validation, network analysis, packet blasting, and network management A test application may cause a network testing system to generate or receive a large number of packets from the network or devices under test. The test application may cause the network testing system to measure, compile and store performance statistics on the network or device under test, which will be referred to as the system under test (SUT). These performance statistics may include volume of traffic measures such as the total number of packets or bytes transmitted or received, quality measures such as the number of transmission failures or bit error rates, or temporal measures such as the minimum, maximum, or average latency or response time of the SUT.

The test application may perform multiple tests on the same network or device, or on multiple networks or devices, concurrently. It may be desired to measure and compile performance statistics on different test parameters, conditions, networks, or devices concurrently. To allow the compilation of multiple sets of performance statistics, received packets may be organized into packet groups, where a packet group is defined as a plurality of packets to be measured by a common set of performance statistics. For example, a packet group may be a plurality of packets sent to, through, or from a specific device or address on the network under test. A packet group may alternatively be referred to as a packet flow or session.

In order to maintain performance statistics on multiple packet groups concurrently, the test system must be able to segregate received packets into the appropriate packet groups. One method for segregating packets is to assign a packet group identification number to each packet group, and then embed the appropriate packet group identification number within each packet. U.S. Pat. No. 6,717,917, entitled "Real-Time Latency", describes a method for accumulating multiple sets of performance statistics on packet groups segregated by means of a packet group identification (PGID) field within each packet. However, a single PGID field lacks flexibility for designing and performing tests on complex networks.

Figure 2:
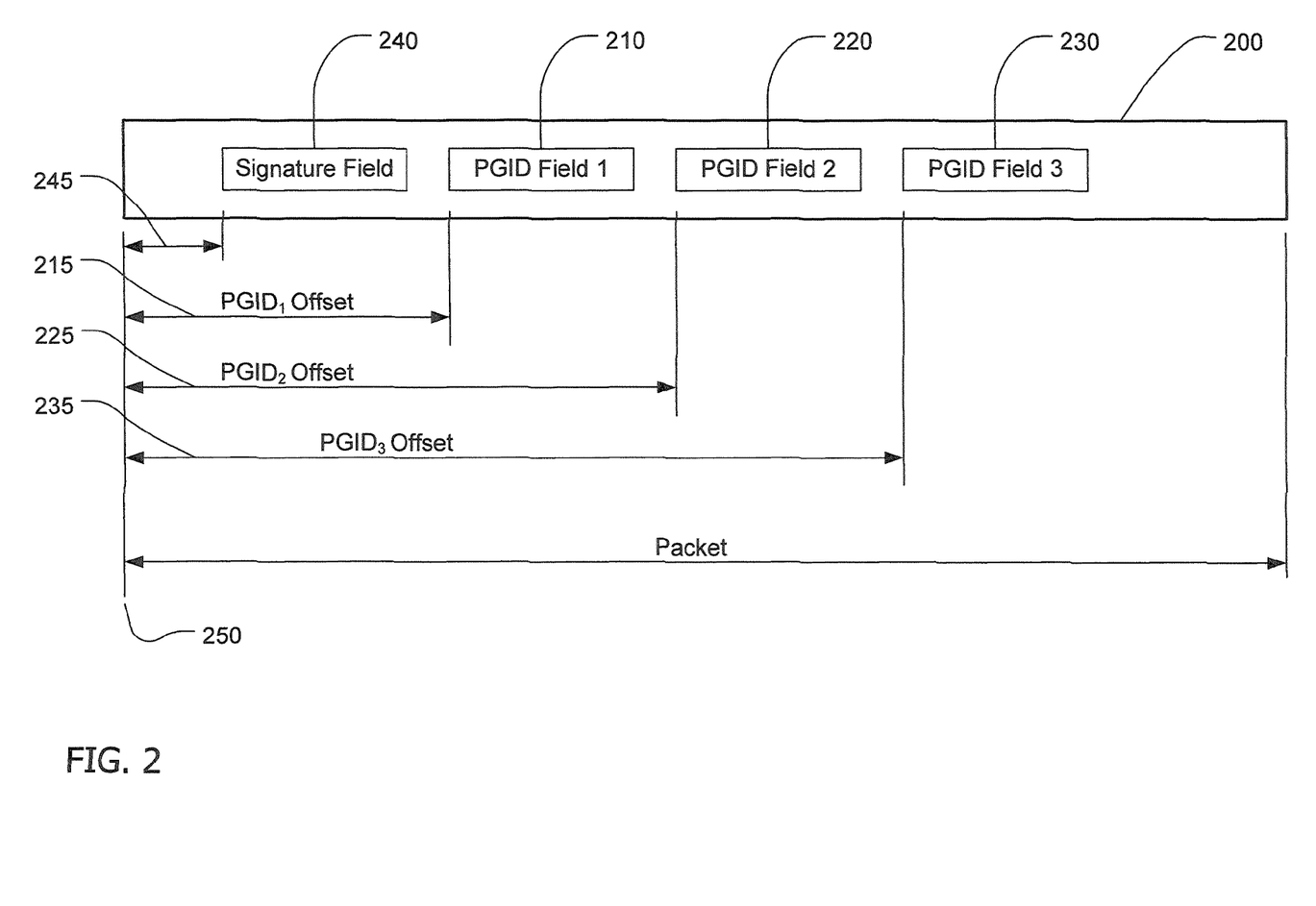
FIG. 2 illustrates packet group identification fields contained within a packet.

Referring now to FIG. 2, a packet 200 received by a networking testing system has a start 250 and an end, and may contain a fixed or variable number of bytes or bits of information. The packet 200 may contain a first PGID field 210, a second PGID field 220, and optionally a third PGID field 230. The packet 200 may include additional PGID fields. The first, second, and third PGID fields 210, 220, 230 may be located within the packet 200 by respective offsets 215, 225, 235, from the start 250 of the packet 200. The first, second, and third PGID fields 210, 220, 230 may be located within the packet 200 by respective offsets from the start of an IP header or from the start of a protocol (TCP, UDP or other) header. The offsets may be measured in bits, bytes, or some other measure. Other techniques may be used for locating the first, second, third, and additional PGID fields within the packet. The PGID fields may be located in any order or position within the packet, and may overlap other PGID fields. Different offsets or techniques may be used to locate each of the first, second, and third PGID fields.

A PGID field may be a specific field inserted in a packet solely to identify a packet as a member of a specific packet group for test purposes. A PGID field may also serve an additional purpose within the packet. For example, a PGID field may comprise all or a portion of a header field, an IP address field, a VLAN (Virtual Local Area Network) Tag, or a MPLS (Multiprotocol Label Switching) label.

Still referring to FIG. 2, the packet 200 may also contain a signature field 240, offset from the start of the packet by a signature offset 245. The signature field 240 may be validated, or compared to a known value. The signature field 240 may be masked prior to validation such that only selected, unmasked, bits are compared to the known values for those bits. Packets with invalid signatures may be excluded, or not considered, when accumulating test statistics.

Some network transmission protocols, such as MPLS, add or stack labels or fields at the head end of packets during transmission through various devices on a network. With these protocols, it may not be possible to locate the PGID fields by means of an offset from the start of the packet without first evaluating and stripping fields added to the front end during transmission. In these and other cases, a method described in co-pending U.S. patent application Ser. No. 11/284,622, entitled "Varying the position of test information in data units", may be used to locate a signature field which, in turn, may be used to locate a PGID field.

Figure 3:
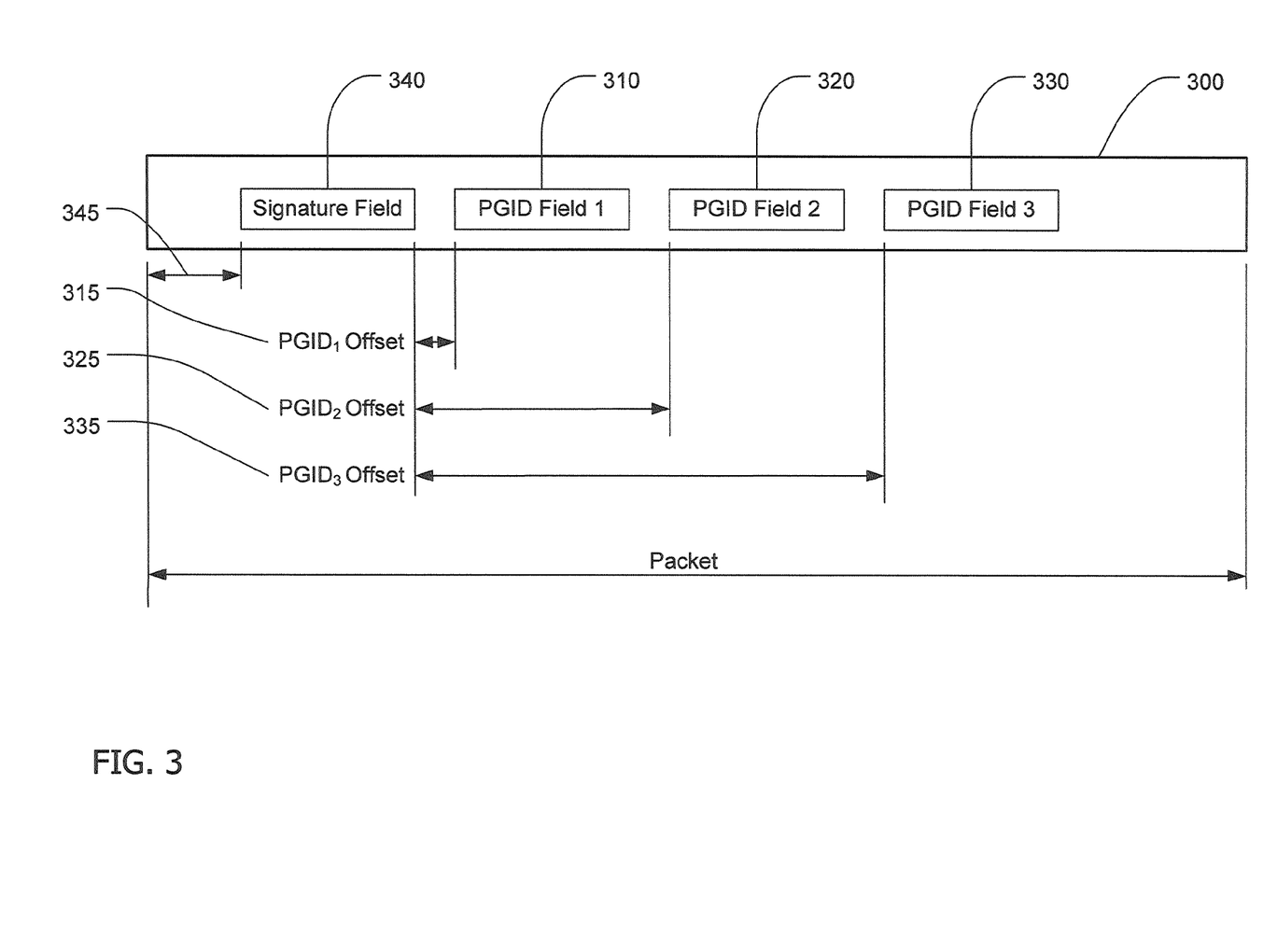
FIG. 3 illustrates packet group identification fields contained within a packet.

Referring to FIG. 3, a packet 300 may contain a first PGID field 310, a second PGID field 320, and optionally a third PGID field 330. The packet 300 may also contain a signature field 340 offset from the start of the packet by a signature field offset 345. The position of the signature field 340 within the packet 300 may vary such that the offset 345 of the signature field 340 from the start of the packet may not be known. Since the position of the signature field 340 is not known, the signature field 340 may be identified by correlating the received bit stream with the known value of the signature field 340. In this case the signature field 340 may be 12 bytes in length or some other length sufficient to ensure unique recognition. Once the signature field 340 has been identified, the first, second, and third PGID fields 310, 320, 330 can be located by means of respective offsets 315, 325, 335 from the end (or start) of the signature field 340.

The methods for locating the PGID fields of FIG. 2 and FIG. 3 may be combined. One or more PGID fields may be located by means of respective offsets from the start of the packet, the IP header, the protocol header, or other PGID fields, and one or more PGID fields may be located by means of respective offsets from a variable-position signature field. Other methods for defining the PGID field locations within a packet may also be used. Any method that allows recovery of the PGID fields may be used.

Figure 4:
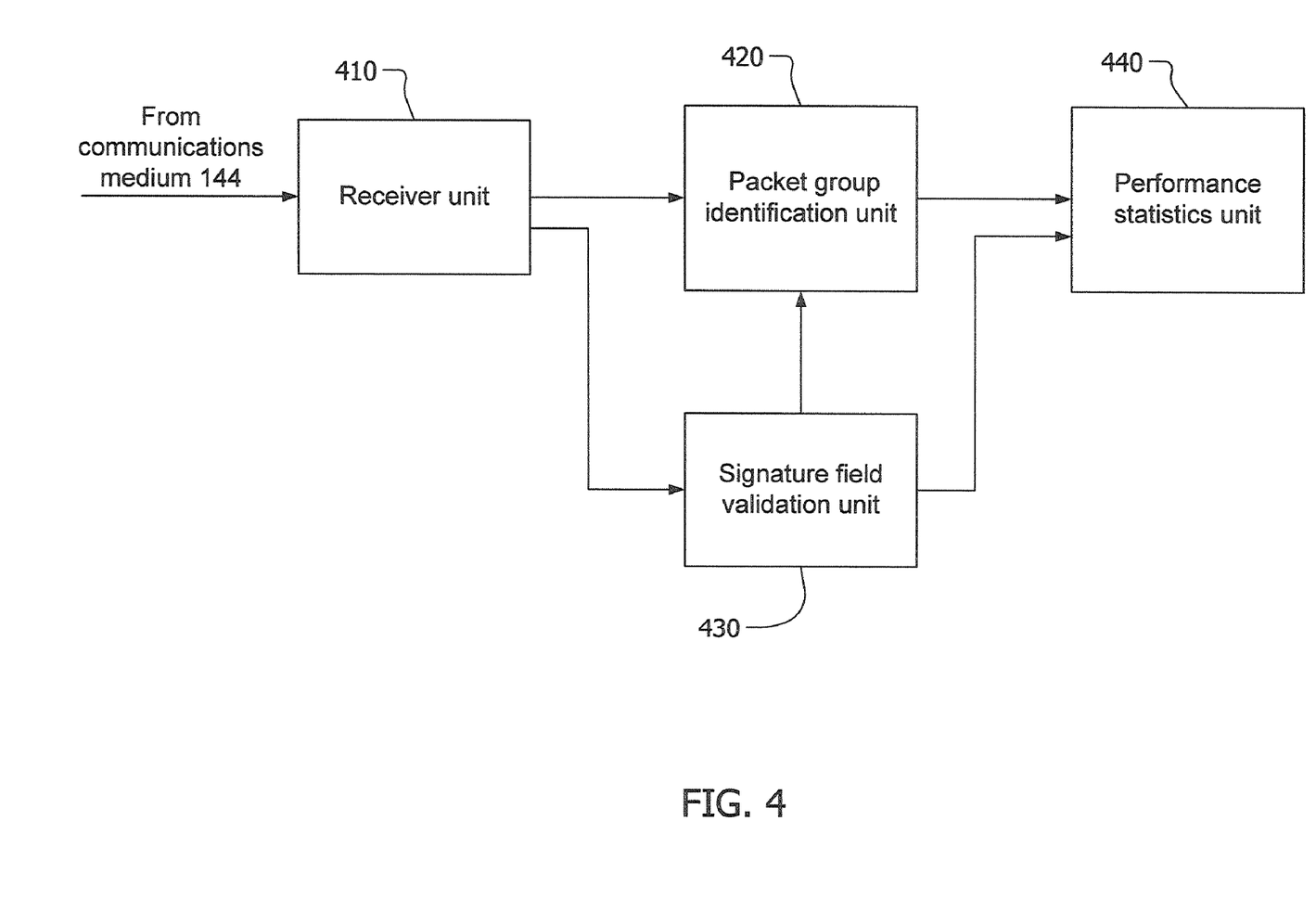
FIG. 4 is a block diagram of an apparatus.

The hardware, firmware, and software components of the network testing system 110 may include various specialized units, circuits, software and interfaces for recovering the packet group identification number and signature field within received packets. Referring to FIG. 4, the network testing system 110 may include a receiver unit 410, a packet group identification unit 420, an optional signature field validation unit 430, and a performance statistics unit 440. Each of these units may be comprised of hardware, firmware, and software operating on a processor as required to implement the functions of the unit. The units may not be physically distinct. Hardware, firmware, and software portions of a given unit may be shared with other units or functions of network testing system 110.

The receiver unit 410 may receive packets as a bit-serial data stream from an optical or electrical communications medium 144. The receiver unit 410 may include an optical detector and circuitry to convert an optical signal to electrical form. The receiver unit 410 may also include circuitry to amplify a received signal, to recover a clock embedded in the received bit-serial data stream, and to remove redundant coding. The receiver unit may also include circuitry to partially convert the bit-serial information into parallel form. The received packets may be transferred to the packet group identification unit 420 and the signature field validation unit 430 as a bit-serial, byte-serial (8 bits in parallel) or word-serial (16 or 32 bits in parallel) data stream.

The packet group identification unit 420 may include circuitry, firmware, and software to locate packet group identification fields within the data stream transferred from the receiver unit 410. The packet group identification unit 420 may also include circuitry to extract and temporarily store the packet group identification fields, and to combine the packet group identification fields to form a packet group identification number that identifies each received packet as a member of a specific packet group. The function of the packet group identification unit will be more fully explained in the subsequent discussion of processes.

The signature field validation unit 430 may include circuitry, firmware, and software to locate a signature identification field within the data stream transferred from the receiver unit 410. The signature field validation unit 430 may locate the signature field by means of a known offset, or may locate the signature field by correlating the data stream with the expected signature field value. The signature field validation unit 430 may also include circuitry, firmware, or software to validate the signature field by comparing the content of the signature with an expected value.

The performance statistics unit 440 may include circuitry, firmware, and software to measure, compile, and store performance statistics on the network, unit or system under test, as previously described. The performance statistics unit 440 may compile performance statistics for packet groups identified by the packet group numbers formed by the packet group identification unit. The performance statistics unit 440 may measure and compile performance statistics only for packets with valid signature fields.

The functions of packet group identification logic 420, the signature field validation logic 430, and the performance statistic processor 440 may be performed in whole or in part by the network communications unit 128 (referring back to FIG. 1) or other hardware on a network card 120. The other hardware may be implemented as analog circuitry, digital circuitry, one or more field programmable gate arrays (FPGA), application specific integrated circuits (ASIC), programmable logic devices (PLD), programmable logic arrays (PLA), other kinds of devices, and combinations of these.

The functions of packet group identification logic 420, the signature field validation logic 430, and the performance statistic processor 440 may be performed in whole or in part in software that operates on a computing device. The computing device may be a processor 124 on a network card 120 or may be an external computing device connected to the network testing system 110. The software may take the form of firmware, an application program, an applet (e.g., a Java applet), a browser plug-in, a COM object, a dynamic linked library (DLL), a script, one or more subroutines, a device driver, or an operating system component or service. The computing device may include a processor, a memory operatively coupled to the processor, and a storage device. The storage device may store instructions that, when executed, cause the computing device to perform, at least in part, the processes and provide the functionality described here. The instructions may be stored on a removable or fixed storage medium. The hardware and software of the computing device may be distributed.

Additional and fewer units, modules or other arrangement of software, hardware and data structures may be used to achieve the systems and devices described herein.

Description of Processes

Figure 5:
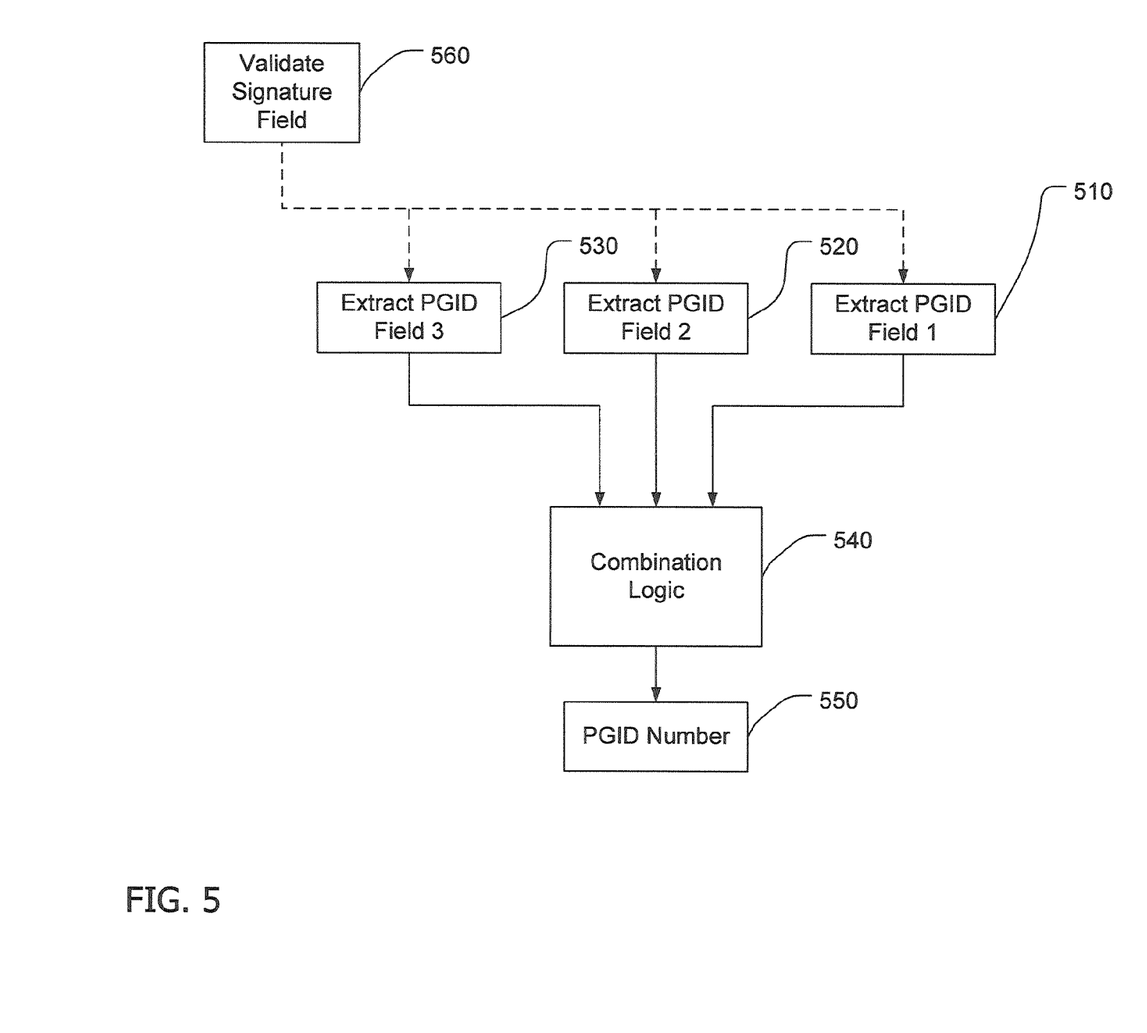
FIG. 5 is a flow chart of a process to determine a packet group ID number.

Referring now to FIG. 5, the process for forming a packet group identification number 550 starts with extracting a first PGID field 510, a second PGID field 520, and optionally a third PGID field 530 from a received packet. The first, second, and, optionally, third PGID fields may be combined by combination logic 540 to generate a single PGID number 550 for each packet. The combination logic 540 may perform one or more logical or mathematical operations on the first, second, and optional third PGID fields to generate the PGID number 550. Within this description and the subsequent claims, the term logic is intended to encompass both the process and the hardware, firmware, and software that performs the logical or mathematical operations. The process of FIG. 5 is consistent with a Packet Group Identification Unit 420 as previously shown in FIG. 4.

Figure 6:
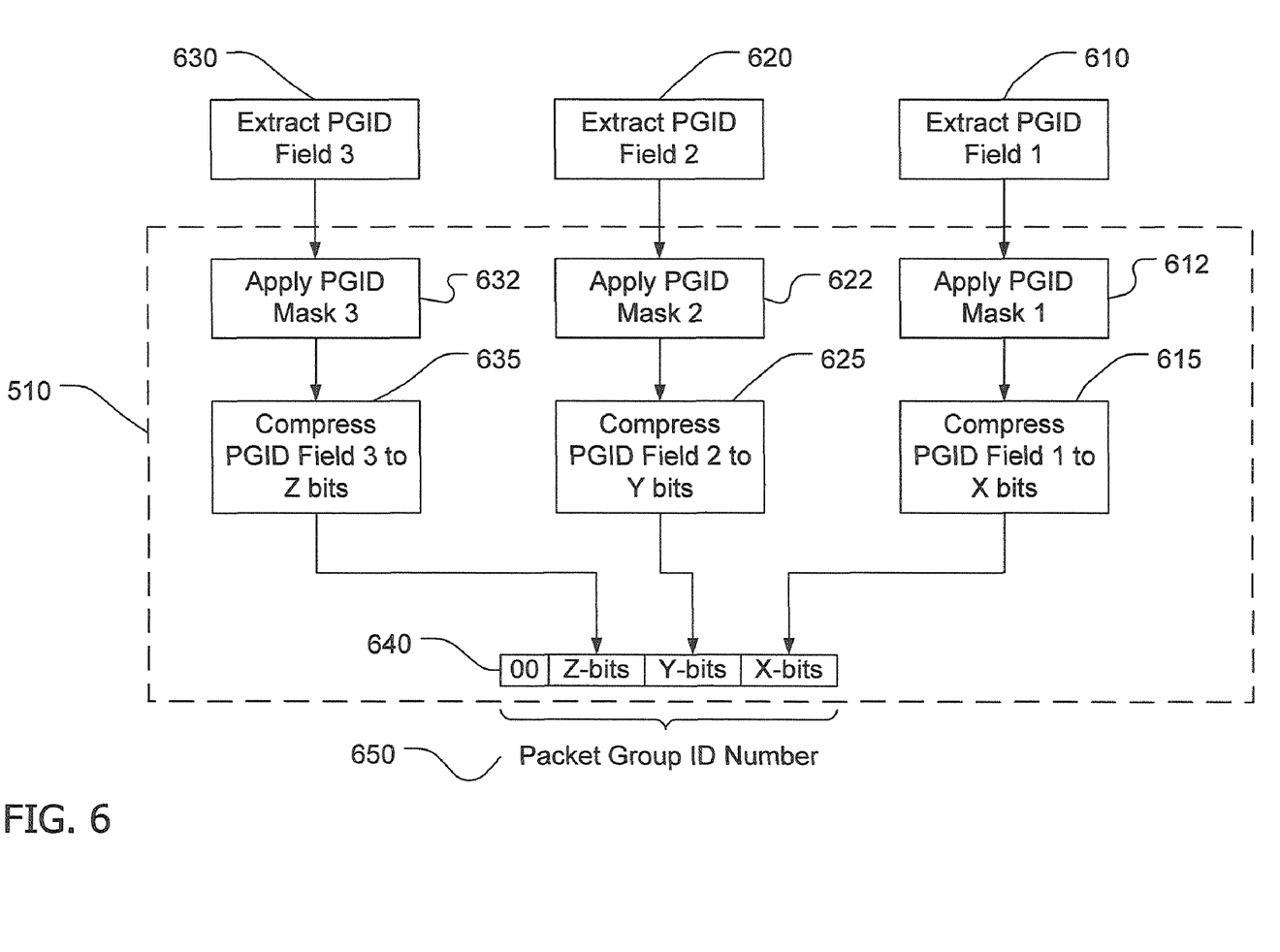
FIG. 6 is a flow chart of a process to determine a packet group ID number.

FIG. 6 is a flow chart of an exemplary embodiment of the combination logic 510. A first PGID mask 612 is applied to a first PGID field 610. Within this description, applying a mask means that bits of the mask are used to determine, on a bit-by-bit basis, which bits of a PGID field are masked or discarded, and which bits are unmasked (retained) and used to generate a PGID number 650. The first PGID mask 612 has the same bit length as the first PGID field 610. For example, a "0" in a given bit position in the first PGID mask 612 may indicate that the corresponding bit of the first PGID field 610 will be unmasked and used, while a "1" in a given bit position in the first PGID mask 612 may indicate that the corresponding bit in the first PGID field 610 will be masked and discarded. The opposite convention ("0"=masked) could also be used. The first PGID mask 612 may contain a total of "X" bits set to zero, where X has value between zero and the number of bits in the first PGID mask. Applying the first PGID mask with X bits set to zero will result in X unmasked bits in the first PGID field 610. The X unmasked bits in the first PGID field 610 may be compressed, or shifted, into the lowest X bit positions in a first compressed PGID field 615.

Similarly, a second PGID mask 622 having Y bits set to zero may be applied to a second PGID field 620 and the unmasked bits may be compressed to form a Y-bit compressed second PGID field 625. A third PGID mask 632 having Z bits set to zero may be applied to a third PGID field 630 and the unmasked bits may be compressed to form a Z-bit compressed third PGID field 635. Finally, the PGID number 650 may be generated by concatenating the X bits from the compressed first PGID field 615, the Y bits from the compressed second PGID field 625, and the Z bits from the compressed third PGID field 635. Zeros may be added in one or more most significant bits positions 640 as needed to complete the desired bit width of the PGID number 650.

The width, in bits, of the first, second, and third PGID fields may be selected for convenience and compatibility with the network transmission protocols, and need not be the same. The hardware and software of the network testing system may not necessarily support or require the full width of the PGID fields. For example, the width of the PGID fields may be 32 bits for convenience, but a network testing system may not be capable of supporting $2^{32}$ distinct packet groups. Thus the PGID number required by the network testing system may have a smaller number of bits than the number of bits in the original PGID fields. Currently available network testing systems may utilize a PGID number having 16, 17, or 21 bits.

Figure 7:
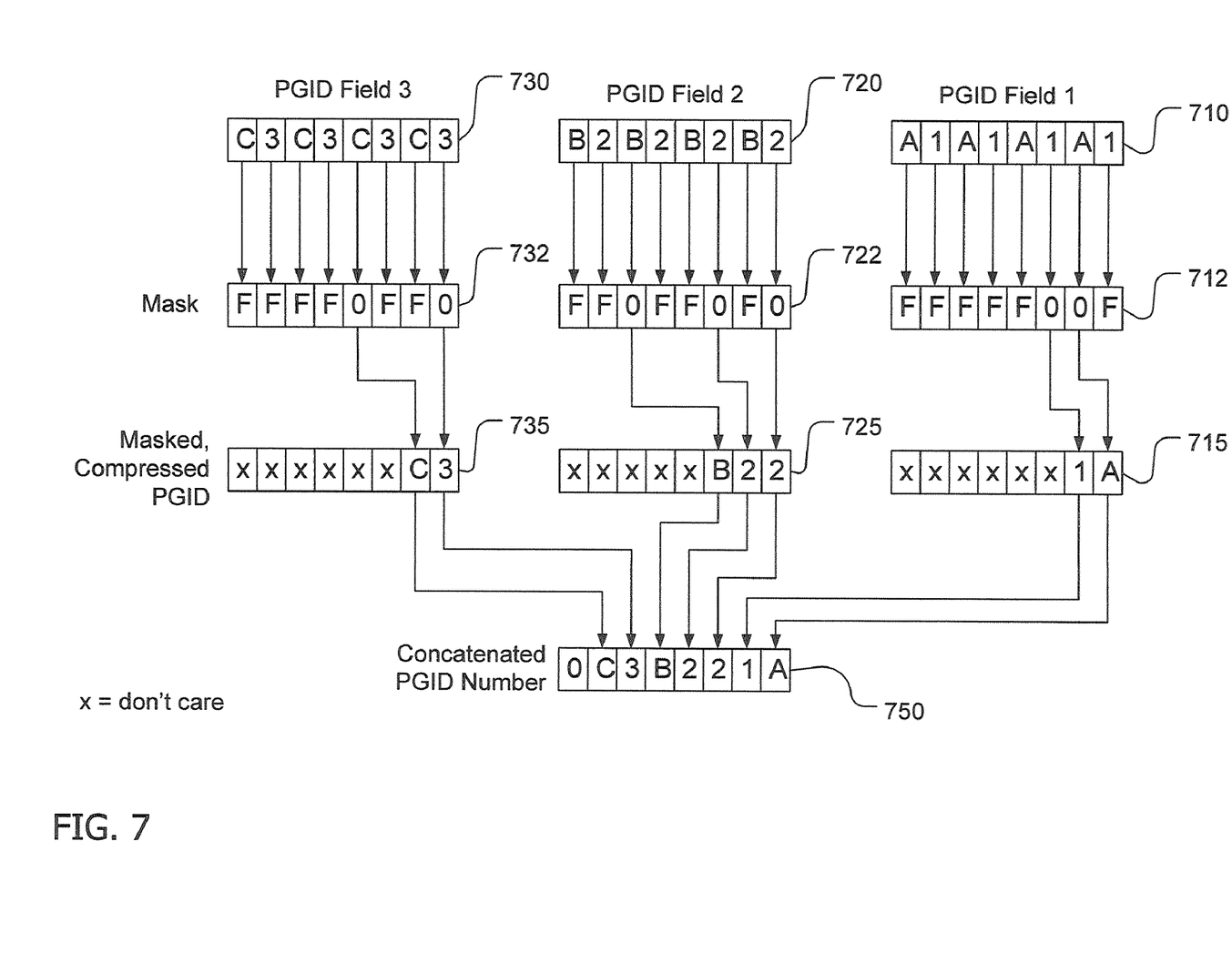
FIG. 7 is an example of a process to determine a packet group ID number.

FIG. 7 is an illustrative example of a method for generating a PGID number. In this example, a first PGID field 710 and a counterpart first PGID mask 712 are 32 bits in width, which may be conventionally numbered from bit 0 to bit 31. The first PGID mask 712 and the first PGID field 710 are each shown as eight hexadecimal digits. The first PGID mask 712 has all of its bits sets to one (hexadecimal "F"=binary "1111") except for the second and third least significant digits (bits 4-11) which are set to zero. When applied to the first PGID field 710, the first PGID mask 712 leaves the second and third digits of PGID field 710 unmasked. These digits are shifted to the least significant positions in a first masked compressed PGID field 715.

Similarly, the application of a second PGID mask 722 to a second PGID field 720 leaves the first third, and sixth digits of the second PGID field 720 unmasked. These digits are then compressed into the three least significant digits of a second masked compressed PGID field 725. In the same manner, the first and fourth digits of a third PGID field 730 are compressed into a third masked compressed PGID field 735. The unmasked digits from the three masked compressed PGID fields are then concatenated to form a PGID number 750.

It should be recognized that the step of compressing the unmasked digits to form the compressed PGID fields is a useful convenience for describing the process of generating the PGID number. In practice, the network testing system may concatenate the unmasked bits from two or three PGID fields without necessarily forming the intermediate compressed PGID fields. It should also be recognized that, while the method was conveniently described in terms of hexadecimal digits, any number and sequence of bits may be left unmasked in each of the two or three PGID fields.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method for testing a network, comprising:
    a network testing system coupled to the network receiving a plurality of packets
    the network testing system determining a packet group identification number for each of the plurality of received packets, wherein determining a packet group identification number for a packet comprises:
        determining a location of a signature field within the packet by correlating the packet with a known value of the signature field
        extracting a first packet group identification field based on the location of the signature field
        extracting a second packet group identification field from a header of the packet
        combining the first packet group identification field and the second packet group identification field to form the packet group identification number
    the network testing system measuring, compiling, and storing performance statistics for packets having the same packet group identification number.

2. The method of testing a network of claim 1, wherein combining the first packet group identification field and the second packet group identification field further comprises:
    applying a first packet group identification mask to the first packet group identification field
    applying a second packet group identification mask to the second packet group identification field
    concatenating the unmasked bits of the first packet group identification field and the unmasked bits of the second packet group identification field to form the packet group identification number.

3. The method of testing a network of claim 1, further comprising validating the signature field prior to determining the packet group identification number.

4. A traffic receiver, comprising:
    a receiver unit to receive packets
    a signature field validation unit comprising logic determine a location of a signature field within the packet by correlating the packet with a known value of the signature field
    a packet group identification unit to determine a packet group identification number for each packet, comprising:
        logic to extract a first packet group identification field based on a location of the signature field
        logic to extract a second packet group identification field from a header of each packet
        logic to combine the first packet identification field and the second packet group identification field to form a packet group identification number for each packet.

5. The traffic receiver of claim 4, further comprising:
    a performance statistics unit to measure, compile, and store performance statistics for packets having the same packet group identification number.

6. The traffic receiver of claim 4, wherein the logic to combine the first packet group identification field and the second packet group identification field further comprises:
    logic to apply a first packet group identification mask to the first packet group identification field
    logic to apply a second packet group identification mask to the second packet group identification field
    logic to concatenate the unmasked bits of the first packet group identification field and the unmasked bits of the second packet group identification field to form the packet group identification number.

7. The traffic receiver of claim 4, wherein
    the signature field validation unit comprises logic to validate the signature field
    the signature field is validated prior to the packet group identification unit determining the packet group identification number.

8. A computing device for testing a network, comprising:
    a processor
    memory coupled to the processor
    a storage device storing instructions which, when executed by the processor, cause the computing device to perform actions comprising:
        receiving a plurality of packets via a network
        determining a packet group identification number for each of the plurality of received packets, wherein determining a packet group identification number for a packet comprises:
            determining a location of a signature field within the packet by correlating the packet with a known value of the signature field
            extracting the first packet group identification field based on a location of the signature field
            extracting a second packet group identification field from a header of the packet
            combining the first packet group identification field and the second packet group identification field to form the packet group identification number
        measuring, compiling, and storing performance statistics for packets having the same packet group identification number.

9. The computing device of claim 8, wherein combining the first packet group identification field and the second packet group identification field further comprises:
- applying a first packet group identification mask to the first packet group identification field
- applying a second packet group identification mask to the second packet group identification field
- concatenating the unmasked bits of the first packet group identification field and the unmasked bits of the second packet group identification field to form the packet group identification number.

10. The computing device of claim 8, the actions performed further comprising validating the signature field prior to determining the packet group identification number.

11. A machine readable non-transitory storage medium storing instructions which, when executed, cause a computing device to perform actions comprising:
- receiving a plurality of packets via a network
- determining a packet group identification number for each of the plurality of received packets, wherein determining a packet group identification number for a packet comprises:
  - determining a location of a signature field within the packet by correlating the packet with a known value of the signature field
  - extracting a first packet group identification field based on a location of the signature field
  - extracting a second group identification field from a header of the packet
  - combining the first packet group identification field and the second packet group identification field to form the packet group identification number
- measuring, compiling, and storing performance statistics for packets having the same packet group identification number.

12. The machine readable non-transitory storage medium of claim 11, wherein combining the first packet group identification field and the second packet group identification field further comprises:
- applying a first packet group identification mask to the first packet group identification field
- applying a second packet group identification mask to the second packet group identification field
- concatenating the unmasked bits of the first packet group identification field and the unmasked bits of the second packet group identification field to form the packet group identification number.

13. The machine readable non-transitory storage medium of claim 11, the actions performed further comprising validating the signature field prior to determining the packet group identification number.

* * * * *